United States Patent
Ahn et al.

(10) Patent No.: US 12,444,746 B2
(45) Date of Patent: Oct. 14, 2025

(54) COMPLEX PARTICLES FOR NEGATIVE ELECTRODE ACTIVE MATERIAL AND NEGATIVE ELECTRODE FOR ALL-SOLID TYPE BATTERY COMPRISING THE SAME

(71) Applicant: LG Chem, Ltd., Seoul (KR)

(72) Inventors: Byoung-Hoon Ahn, Daejeon (KR); Kyung-Taek Kim, Daejeon (KR); Ki-Tae Kim, Daejeon (KR); Chan-Soo Jun, Daejeon (KR); Sang-Hoon Choy, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 584 days.

(21) Appl. No.: 17/044,108

(22) PCT Filed: May 24, 2019

(86) PCT No.: PCT/KR2019/006282
§ 371 (c)(1),
(2) Date: Sep. 30, 2020

(87) PCT Pub. No.: WO2019/226020
PCT Pub. Date: Nov. 28, 2019

(65) Prior Publication Data
US 2021/0184218 A1    Jun. 17, 2021

(30) Foreign Application Priority Data
May 25, 2018    (KR) .................. 10-2018-0059800

(51) Int. Cl.
*H01M 4/587*    (2010.01)
*H01M 10/0525*    (2010.01)
(Continued)

(52) U.S. Cl.
CPC ....... *H01M 4/587* (2013.01); *H01M 10/0525* (2013.01); *H01M 10/0562* (2013.01);
(Continued)

(58) Field of Classification Search
CPC ............. H01M 4/587; H01M 10/0525; H01M 10/0562; H01M 2004/021;
(Continued)

(56) References Cited

U.S. PATENT DOCUMENTS

2008/0274406 A1* 11/2008 Fuse ....................... C01B 32/21
                                                                        252/511
2009/0258298 A1* 10/2009 Umeno ............. C04B 35/62884
                                                                        427/113
(Continued)

FOREIGN PATENT DOCUMENTS

CN    106410129 A    2/2017
CN    107112536 A *  8/2017 ............. C01B 32/20
(Continued)

OTHER PUBLICATIONS

Li, S., Xie, M., Liu, J., Wang, H., & Yan, H. (2011). Layer structured sulfur/expanded graphite composite as cathode for lithium battery. Electrochemical and Solid-State Letters, 14(7), A105. (Year: 2011).*
(Continued)

*Primary Examiner* — Milton I Cano
*Assistant Examiner* — Albert Michael Hilton
(74) *Attorney, Agent, or Firm* — Lerner David LLP (57) ABSTRACT

Complex particles for a negative electrode active material according to the present disclosure have no problem with reduced capacity and output by virtue of sufficient electrochemical reaction sites between a solid electrolyte and an electrode active material. The complex particles according to the present disclosure include carbon particles of a carbon material such as flaky graphite, which are spherical in shape by shape modification, and a solid electrolyte and a conductive material filled between the particles, and thus have the increased contact area between the active material and the solid electrolyte increases, and ion conduction and
(Continued)

electron conduction paths extended and maintained to the inside of the active material particles.

13 Claims, 3 Drawing Sheets

(51) Int. Cl.
*H01M 10/0562* (2010.01)
*H01M 4/02* (2006.01)

(52) U.S. Cl.
CPC .............. *H01M 2004/021* (2013.01); *H01M 2004/027* (2013.01); *H01M 2220/20* (2013.01); *H01M 2300/0068* (2013.01)

(58) Field of Classification Search
CPC ....... H01M 2004/027; H01M 2220/20; H01M 2300/0068
See application file for complete search history.

(56) References Cited

U.S. PATENT DOCUMENTS

| | | | |
|---|---|---|---|
| 2013/0130117 A1* | 5/2013 | Yamamoto | H01M 4/587 241/3 |
| 2014/0154584 A1 | 6/2014 | Nagase et al. | |
| 2014/0170503 A1 | 6/2014 | Yushin et al. | |
| 2014/0178762 A1* | 6/2014 | Lee | H01M 4/133 429/231.4 |
| 2014/0212750 A1 | 7/2014 | Ahn et al. | |
| 2016/0156021 A1 | 6/2016 | Aihara et al. | |
| 2016/0181612 A1* | 6/2016 | Lee | H01G 11/24 252/182.1 |
| 2016/0293342 A1 | 10/2016 | Yumoto et al. | |
| 2017/0033352 A1 | 2/2017 | Mizutani | |
| 2017/0214051 A1 | 7/2017 | Yoon et al. | |
| 2018/0114979 A1* | 4/2018 | Yoon | H01M 10/0585 |
| 2019/0027742 A1 | 1/2019 | Matsumoto et al. | |
| 2020/0185721 A1* | 6/2020 | Yamada | H01M 10/0525 |
| 2021/0036311 A1 | 2/2021 | Matsumura | |
| 2022/0199995 A1 | 6/2022 | Kim et al. | |

FOREIGN PATENT DOCUMENTS

| | | | | |
|---|---|---|---|---|
| JP | H11007942 | A | | 1/1999 |
| JP | 2002373643 | A | | 12/2002 |
| JP | 2003059492 | A | | 2/2003 |
| JP | 200981106 | A | | 4/2009 |
| JP | 5042854 | B2 | | 10/2012 |
| JP | 2013214421 | A | | 10/2013 |
| JP | 2016103411 | A | | 6/2016 |
| JP | 6080653 | B2 | | 2/2017 |
| JP | 201754720 | A | | 3/2017 |
| JP | 2017152147 | A | | 8/2017 |
| JP | 2017191942 | A | | 10/2017 |
| JP | 2017220339 | A | | 12/2017 |
| JP | 6432520 | B2 * | 12/2018 | ............ H01M 4/364 |
| KR | 101325555 | B1 | | 11/2013 |
| KR | 101430733 | B1 | | 8/2014 |
| KR | 20170021751 | A | | 2/2017 |
| KR | 20170089333 | A | | 8/2017 |
| KR | 20180043887 | A | | 5/2018 |
| WO | 2017169616 | A1 | | 10/2017 |
| WO | 2019065030 | A1 | | 4/2019 |

OTHER PUBLICATIONS

Machine translation of JP-6432520-B2 (Year: 2024).*
Extended European Search Report including Written Opinion for Application No. 19807638.2 dated May 26, 2021, pp. 1-10.
Search report from International Application No. PCT/KR2019/006282, mailed Sep. 20, 2019.

* cited by examiner

FIG. 1

Prior Art

COMPLEX PARTICLES FOR NEGATIVE ELECTRODE ACTIVE MATERIAL AND NEGATIVE ELECTRODE FOR ALL-SOLID TYPE BATTERY COMPRISING THE SAME

CROSS-REFERENCE TO RELATED APPLICATIONS

This application is a national phase entry under 35 U.S.C. § 371 of International Application No. PCT/KR2019/006282 filed May 24, 2019, which claims priority from Korean Patent Application No. 10-2018-0059800 filed May 25, 2018, all of which are incorporated herein by reference.

TECHNICAL FIELD

The present disclosure relates to composite particles for a negative electrode active material and an electrochemical device comprising the same. The electrochemical device according to the present application is, in particular, an all-solid type battery using a solid electrolyte.

BACKGROUND ART

A lithium ion battery using a liquid electrolyte has a structure in which a negative electrode and a positive electrode are separated by a separator, and when the separator is damaged by deformation or external impacts, a short may occur, leading to overheat or explosion. To solve the above-described problem, a solid electrolyte material using ion conductive polymer or inorganics and an all-solid type battery using the same have been developed. A lithium secondary battery using a solid electrolyte has enhanced battery safety and improved battery reliability by preventing an electrolyte solution from leaking, and is easy to manufacture thin batteries. The solid electrolyte may be largely classified into a polymer electrolyte material and an inorganic solid electrolyte material according to the properties of the material. The use of the solid electrolyte has battery performance advantages including safety, high energy density, high output and long life, and a simple manufacturing process, large scale/compact design and low cost are further advantages, and thus in recent years, more and more attention has been paid. Still, the lithium ionic conductivity of the solid electrolyte is lower than that of liquid electrolyte, but it is reported that, theoretically, ionic conductivity in a solid is higher than ionic conductivity in a liquid, and from the perspective of charge/discharge rate and high output, an all-solid type lithium ion battery is worth attention.

When a solid electrolyte is used, it is necessary to maintain a close contact between the active material and the electrolyte to ensure ionic conductivity. In case that a carbon material such as spherical graphite is used for a negative electrode active material of an all-solid type battery and a liquid electrolyte is used, the electrolyte can penetrate into the pores in the graphite particles, but in case that a solid electrolyte is used, the pores remain empty, and there is a reduction in the contact area between the electrolyte and the active material particles, i.e., sites in which electrochemical reactions can occur, resulting in reduced capacity and output.

There is a need for the development of a new negative electrode material for use in an all-solid type battery without capacity and output reduction.

DISCLOSURE

Technical Problem

The present disclosure is directed to providing a carbon-based negative electrode active material for use in an all-solid type battery using a solid electrolyte without capacity and output reduction by virtue of sufficient electrochemical reaction sites between the solid electrolyte and the electrode active material. The present disclosure is further directed to providing a method for preparing the carbon-based negative electrode active material. These and other objects and advantages of the present disclosure will be understood from the following description. Meanwhile, it is apparent that the objects and advantages of the present disclosure can be realized by means or methods set forth in the appended claims and their combination.

Technical Solution

The present disclosure relates to complex particles for a negative electrode active material for an all-solid type battery. A first aspect of the present disclosure relates to the complex particles, and the complex particles include graphite particles of a granulated graphite material, wherein the graphite material is derived from any one of natural graphite or artificial graphite, a mixture including a solid electrolyte and a conductive material fills gaps between the graphite materials of the graphite particles, and an outer surface of the graphite particles is coated with the mixture in whole or at least in part.

According to a second aspect of the present disclosure, in the first aspect, a particle diameter of the complex particles is 5 μm to 50 μm.

According to a third aspect of the present disclosure, in any one of the first and second aspects, the natural graphite is at least one highly crystalline natural graphite selected from platy, flaky, wavy, elliptical or whisker-shaped natural graphite.

According to a fourth aspect of the present disclosure, in any one of the first to third aspects, an amount of the solid electrolyte is 3 weight % to 50 weight % based on 100 weight % of the complex particles.

According to a fifth aspect of the present disclosure, in any one of the first to fourth aspects, the solid electrolyte includes a sulfide-based solid electrolyte.

According to a sixth aspect of the present disclosure, in any one of the first to fifth aspects, the conductive material includes one selected from graphite, carbon black, a conductive fiber, metal powder, potassium titanate, conductive whisker, conductive metal oxide, a polyphenylene derivative, or their mixture.

In addition, the present disclosure relates to a method for preparing complex particles for a negative electrode active material. A seventh aspect of the present disclosure relates to the preparation method, and the preparation method includes preparing a mixture including a graphite material, a conductive material and a solid electrolyte, and performing a spherical granulation process on the mixture by applying an external mechanical force to obtain complex particles into which the graphite material, the conductive material and the solid electrolyte are integrally formed.

According to an eighth aspect of the present disclosure, in the seventh aspect, the granulation process is performed using one selected from a pulverizer selected from Counter Jet Mill (Hosokawa Micron, JP), ACM pulverizer (Hosokawa Micron, JP), or Current Jet (Nisshin, JP); a granulator selected from SARARA® (Kawasaki Heavy Industries, Ltd, JP), GRANUREX® (Freund Corporation, JP), New-Gra Machine (Seishin, JP) or Agglomaster (Hosakawa Micron, JP); a mixer selected from a dispersion kneader or two-roll; and compression and shear processing machine selected from Mechano Micros, an extruder, a ball mill, a planetary mill, Mechano Fusion system, Nobilta, Hybridization System or a rotary ball mill or their combination.

According to a ninth aspect of the present disclosure, in any one of the seventh and eighth aspects, the mixture includes 49 weight % to 95 weight % of the graphite material, 3 weight % to 50 weight % of the solid electrolyte, and 1 weight % to 10 weight % of the conductive material.

According to a tenth aspect of the present disclosure, in any one of the seventh to ninth aspects, an all-solid type battery includes a negative electrode, a positive electrode and a solid electrolyte film interposed between the negative electrode and the positive electrode, wherein the negative electrode includes the complex particles according to the present disclosure for a negative electrode active material.

Advantageous Effects

The composite particles according to the present disclosure include carbon particles of a carbon material such as flaky graphite, which are spherical in shape by shape modification, and a solid electrolyte and a conductive material filled between the carbon material particles, and thus have the increased contact area between the active material and the solid electrolyte, and ion conduction and electron conduction paths extended and maintained to the inside of the active material particles. Accordingly, despite the use of the solid electrolyte, a battery manufactured using the complex particles has no problem with battery capacity or output reduction, as opposed to the conventional graphite negative electrode active material. Additionally, because the complex particles include carbon particles filled with the solid electrolyte and the conductive material, it is possible to manufacture a high density electrode having low porosity, even if severe conditions are not applied to reduce the porosity of an electrode when manufacturing the electrode.

BRIEF DESCRIPTION OF DRAWINGS

The accompanying drawings illustrate a preferred embodiment of the present disclosure, and together with the above detailed description, serve to provide further understanding of the technical aspects of the present disclosure, and thus, the present disclosure should not be construed as being limited to the drawings. Meanwhile, the shape, size, scale or proportion of the elements in the drawings as used herein may be exaggerated to emphasize clearer description.

MODE FOR DISCLOSURE

Hereinafter, the embodiments of the present disclosure will be described in detail. Prior to the description, it should be understood that the terms or words used in the specification and the appended claims should not be construed as limited to general and dictionary meanings, but interpreted based on the meanings and concepts corresponding to the technical aspects of the present disclosure on the basis of the principle that the inventor is allowed to define terms appropriately for the best explanation. Therefore, the context in the embodiments described herein are just a most preferred embodiment of the present disclosure, but not intended to fully describe the technical aspects of the present disclosure, so it should be understood that other equivalents and modifications could be made thereto at the time the application was filed.

The term 「 comprises 」 when used in this specification, specifies the presence of stated elements, but does not preclude the presence or addition of one or more other elements, unless the context clearly indicates otherwise.

The terms 「 about 」 and 「 substantially 」 are used herein in the sense of at, or nearly at, when given the manufacturing and material tolerances inherent in the stated circumstances and are used to prevent the unscrupulous infringer from unfairly taking advantage of the present disclosure where exact or absolute figures are stated as an aid to understanding the present disclosure.

「 A and/or B 」 when used in this specification, specifies 「 either A or B or both 」.

The ratio of each material when used in this specification, is based on weight, unless the context clearly indicates otherwise.

In the following detailed description, specific terms are used for convenience and are not limiting. The terms 'right', 'left' top' and 'bottom' refer to the directions in the drawings to which reference is made. The terms 'inward' and 'outward' refer to the directions toward or away from the geometrical centers of the designated devices, systems and members thereof. The terms 'front', 'rear', 'up', 'down' and related words and phrases refer to the locations and directions in the drawings to which reference is made and are not limiting. These terms include the above-listed words and their derivatives and synonyms.

The present disclosure relates to complex particles used for a negative electrode active material of an electrochemical device, a negative electrode comprising the complex particles and an electrochemical device comprising the same. Additionally, the present disclosure provides a method for manufacturing the complex particles. In the present disclosure, the electrochemical device may be a lithium ion secondary battery, and in particular, an all-solid type battery using a solid electrolyte as an electrolyte.

Complex Particle

The present disclosure relates to a negative electrode active material for an all-solid type battery that achieves high density of the negative electrode and has high capacity characteristics and long cycling characteristics.

In an embodiment of the present disclosure, the negative electrode active material is composite particles including a graphite material, a solid electrolyte and a conductive material. The composite particles according to the present disclosure may be secondary particles resulting from agglomeration of graphite materials in primary particle form, and gaps between the granulated graphite material are filled with a mixture including the solid electrolyte and the conductive material. Additionally, the surface of the complex particles may be coated with the mixture in whole or in at least part.

In a particular embodiment of the present disclosure, the complex particles include graphite particles formed by spherical shaping or shape modification of graphite materials such as flaky and/or platy graphite, and they are filled with a mixture of the solid electrolyte and the conductive material. Additionally, the surface of the graphite particles may be coated with the mixture in whole or in at least part. In an embodiment of the present disclosure, the complex particles may be obtained by shape modification of the mixture including the graphite material such as flaky graphite and/or platy graphite, the solid electrolyte and the conductive material using an external mechanical force, followed by granulation.

Figure 2:
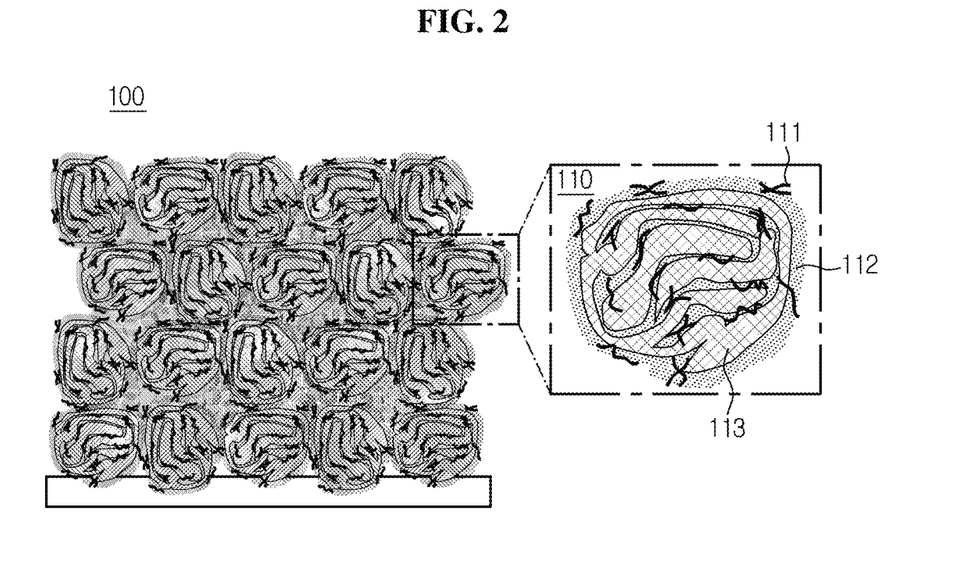
FIG. 2 is a schematic cross-sectional view of complex particles according to an embodiment of the present disclosure and an electrode comprising the complex particles.

FIG. 2 is a schematic cross-sectional view of the complex particles 110 of the present disclosure and the electrode 100 including the same. As shown in FIG. 2, the complex particles 110 according to the present disclosure include graphite particles 113 modified into spherical shape, a solid electrolyte 112 and a conductive material 111, in combination. In an embodiment of the present disclosure, the complex particles may have the particle diameter of about 5 μm to 50 μm on the basis of the longest diameter. In an embodiment of the present disclosure, the particle diameter may be controlled to 45 μm or less, 40 μm or less, 30 μm or less, 20 μm or less, 15 μm or less or 10 μm or less, or the particle diameter may be controlled to 7 μm or more, 15 μm or more, 20 μm or more, 25 μm or more, 35 μm or more or 45 μm or more. For example, the particle diameter may have the range of 5 μm to 25 μm or 10 μm to 20 μm.

In an embodiment of the present disclosure, the graphite material may be present in an amount ranging from 49 weight % to 95 weight % based on 100 weight % of the complex particles. Within the above-described range, the graphite material may be present in an amount of 50 weight % or more, 60 weight % or more, 70 weight % or more, 80 weight % or more or 90 weight % or more. Additionally, the solid electrolyte may be present in an amount ranging from 3 weight % to 50 weight % based on 100 weight % of the complex particles, and within the above-described range, the solid electrolyte may be present in an amount of 40 weight % or less, 30 weight % or less, 20 weight % or less or 10 weight % or less. When the amount of graphite material is less than 50 weight %, the electrode including the complex particles has high ionic conductivity of lithium but low electrical energy density. Meanwhile, when the amount of graphite material in the complex particles is more than 95 weight %, ionic conductivity of lithium reduces, failing to implement the battery capacity by the charge/discharge, and the output characteristics degrade. Additionally, an amount of conductive material may be 1 to 10% based on 100 weight % of the complex particles, and the amount of conductive material may be controlled within the above-described range according to the amount and volume of the solid electrolyte that constitutes the complex particles. When the amount of conductive material is small relative to the amount of the solid electrolyte, conductivity between graphite material particles may reduce.

In an embodiment of the present disclosure, the graphite material may be at least one selected from natural graphite or artificial graphite. The natural graphite may be at least one highly crystalline natural graphite selected from platy, flaky, wavy, elliptical or whisker-shaped natural graphite. Additionally, the artificial graphite may include at least one selected from the group consisting of mosaic cokes-based artificial graphite and needle cokes-based artificial graphite.

In a particular embodiment of the present disclosure, the graphite material may be highly crystalline graphite having an interlayer spacing $d_{002}$ of (002) plane of less than 0.337 nm, for example, between 0.3340 nm and 0.3360 nm, by an X-ray diffraction (XRD) measuring instrument. Typical examples of the graphite material are platy and flaky natural graphite. Graphite having high crystallinity grows with regular crystallinity into flaky shape.

For the platy graphite or flaky graphite, commercial available products may be used. Alternatively, preferably, graphite of various shapes including coarse-particle natural graphite or artificial graphite may be pulverized into platy or flaky shape using a pulverizer. In an embodiment of the present disclosure, the platy and/or flaky graphite may have an average particle diameter $D_{50}$ of 2 μm to 30 μm.

The pulverizer may include Counter Jet Mill (Hosokawa Micron) and Current Jet (Nisshin Engineering). The platy and/or flaky graphite obtained by pulverization has areas of an acute angle on the surface, but spherical granulation by applying an external mechanical force makes the surface smooth.

The solid electrolyte includes an ion conductive solid electrolyte material, and may include a polymer solid electrolyte, an inorganic solid electrolyte or their mixture. The solid electrolyte preferably shows ionic conductivity of $10^{-7}$ s/cm or more.

In an embodiment of the present disclosure, the polymer solid electrolyte may be a solid polymer electrolyte formed by adding polymer resin to a solvated lithium salt, or a polymer gel electrolyte in which in an organic electrolyte solution containing an organic solvent and a lithium salt is confined in polymer resin.

For example, the solid polymer electrolyte may include one selected from the group consisting of polyether-based polymer, polycarbonate-based polymer, acrylate-based polymer, polysiloxane-based polymer, phosphagen-based polymer, polyethylene derivatives, alkylene oxide derivatives, phosphoric acid ester polymer, poly agitation lysine, polyester sulfide, polyvinyl alcohol, polyvinylidene fluoride and polymer containing ionic dissociation groups or their mixture, but is not limited thereto.

In a particular embodiment of the present disclosure, the solid polymer electrolyte is polymer resin and may include one selected from the group consisting of branched copolymer made by copolymerization of a comonomer of amorphous polymer such as PMMA, polycarbonate, polysiloxane (pdms) and/or phosphagen into the main chain of poly ethylene oxide (PEO), comb-like polymer resin and cross-linked polymer resin, or their mixture.

Additionally, in a particular embodiment of the present disclosure, the polymer gel electrolyte includes a lithium salt-containing organic electrolyte solution and polymer resin, and the organic electrolyte solution may be present in an amount of 60 to 400 parts by weight based on the weight of the polymer resin. The polymer resin applied to the gel electrolyte is not limited to a particular type, but for example, may be one selected from the group consisting of polyvinyl chloride (PVC)-based, poly(methyl methacrylate) (PMMA)-based, polyacrylonitrile (PAN), polyvinylidene fluoride (PVdF) and poly(vinylidene fluoride-hexafluoro-propylene☐(PVdF-HFP), or their mixture, but is not limited thereto.

In the electrolyte of the present disclosure, the above-described lithium salt is an ionizable lithium salt that may be represented by $Li^+X^-$. The anion X of the lithium salt is not limited to a particular type, but may include, for example, $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2$ $(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

Meanwhile, in a particular embodiment of the present disclosure, the polymer-based solid electrolyte may further include an additional polymer gel electrolyte. The polymer gel electrolyte has high ionic conductivity (or $10^4$ s/m or more) and binding properties and thus provides the function as an electrolyte as well as the function of an electrode binder resin that provides binding of the electrode active material and binding between the electrode layer and the current collector.

Meanwhile, in the present disclosure, the inorganic solid electrolyte may include a sulfide-based solid electrolyte, an oxide-based solid electrolyte, or both.

In a particular embodiment of the present disclosure, the sulfide-based solid electrolyte includes the element sulfur in the electrolyte composition, and is not limited to a particular type, and may include at least one of a crystalline solid electrolyte, a non-crystalline solid electrolyte (glass solid electrolyte), or a glass ceramic solid electrolyte. Specific examples of the sulfide-based solid electrolyte include LPS-based sulfide including sulfur and phosphorus (for example, $Li_2S$—$P_2S_5$), $Li_{4-x}Ge1_{-x}P_xS_4$(x is 0.1 to 2, to be specific, x is ¾, ⅔), $Li_{10\pm1}MP_2X_{12}$(M=Ge, Si, Sn, Al, X=S, Se), $Li_{3.833}Sn_{0.833}As_{0.166}S_4$, $Li_4SnS_4$, $Li_{3.25}Ge_{0.25}P_{0.75}S_4$, $Li_2S$—$P_2S_5$, $B_2S_3$—$Li_2S$, $xLi_2S$—$(100-x)P_2S_5$(x is 70 to 80), $Li_2S$—$SiS_2$—$Li_3N$, $Li_2S$—$P_2S_5$—LiI, $Li_2S$—$SiS_2$—LiI, $Li_2S$—$B_2S_3$—LiI, Thio-LISICON-based compounds such as $Li_{3.25}Ge_{0.25}P_{0.75}S_4$ and $Li_{10}SnP_2S_{12}$, but are not limited thereto.

In a particular embodiment of the present disclosure, the oxide-based solid electrolyte may include LLTO-based compounds $(La,Li)TiO_3)$, $Li_6La_2CaTa_6O_{12}$, $Li_6La_2ANb_2O_{12}$(A is Ca and/or Sr), $Li_2Nd_3TeSbO_{12}$, $Li_3BO_{2.5}N_{0.5}$, $Li_9SiAlO_8$, LAGP-based compounds $(Li_{1+x}Al_xGe_{2-x}(PO_4)_3$, $0 \leq x \leq 1$, $0 \leq y \leq 1$), LATP-based compounds such as $Li_2O$—$Al_2O_3$—$TiO_2$—$P_2O_5$ $(Li_{1+x}Al_xTi_{2-x}(PO_4)_3$, $0 \leq x \leq 1$, $0 \leq y \leq 1$), $Li_{1+x}Ti_{2-x}Al_xSi_y(PO_4)_{3-y}(0 \leq x \leq 1, 0 \leq y \leq 1)$, $LiAl_xZr_{2-x}(PO_4)_3$ $(0 \leq x \leq 1$, $0 \leq y \leq 1$), $LiTi_xZr_{2-x}(PO_4)_3(0 \leq x \leq 1$, $0 \leq y \leq 1$), LPS-based compounds such as $Li_2S$—$P_2S_5$, $Li_{3.833}Sn_{0.833}AS_{0.166}S_4$, $Li_4SnS_4$, $Li_{3.25}Ge_{0.25}P_{0.75}S_4$, $B_2S_3$—$Li_2S$, $xLi_2S$—$(100-x)P_2S_5$(x is 70~80), $Li_2S$—$SiS_2$—$Li_3N$, $Li_2S$—$P_2S_5$—LiI, $Li_2S$—$SiS_2$—LiI, $Li_2S$—$B_2S_3$—LiI, $Li_3N$, LISICON, LIPON-based compounds $(Li_{3+y}PO_{4-x}N_x$, $0 \leq x \leq 1$, $0 \leq y \leq 1$), Thio-LISICON-based compounds such as $Li_{3.25}Ge_{0.25}P_{0.75}S_4$, perovskite-based compounds $((La, Li)TiO_3)$, NASICON-based compounds such as $LiTi_2(PO_4)_3$ and LLZO-based compounds including lithium, lanthanum, zirconium and oxygen as components, and may include one or more of these. However, the oxide-based solid electrolyte is not particularly limited thereto.

The conductive material is not limited to a particular type and includes those having conductivity while not causing a chemical change to the corresponding battery, and may include, for example, one selected from graphite including natural graphite or artificial graphite; carbon black including carbon black, acetylene black, ketjen black, channel black, furnace black, lamp black and thermal black; conductive fibers including carbon fibers such as vapor grown carbon fiber (VGCF) or metal fibers; metal powder including fluorocarbon, aluminum and nickel powder; conductive whiskers including zinc oxide and potassium titanate; conductive metal oxide including titanium oxide; conductive materials including polyphenylene derivatives, or their mixture.

Method for Preparing Complex Particles

The present disclosure provides a method for preparing complex particles. The complex particles may be obtained by preparing a mixture including a graphite material, a conductive material and a solid electrolyte as described above, and performing a spherical granulation process on the mixture by applying an external mechanical force to obtain complex particles into which the graphite material, the conductive material and the solid electrolyte are integrally formed.

The mixing may be performed using a well-known mixer, for example, a planetary mixer. For example, the graphite material, the conductive material and the solid electrolyte are input into the mixer and stirred at the rate of about 20 rpm to 100 rpm into the mixture. The mixing may be performed in the range of about 1 hour to 3 hours, under the temperature condition of about 30° C. to 100° C. However, the stirring conditions such as the speed, time and temperature are not limited to the above-described range and may be properly controlled to obtain a uniformly mixed phase of the input materials.

The mixture obtained in the mixing step is fed into the spherical granulation step by applying an external mechanical force such as shear and compressive stress. In a particular embodiment of the present disclosure, the granulation step may be performed using Mechano Fusion system. In an embodiment of the present disclosure, the process may be performed at about 2,000 rpm to 5,000 rpm. Additionally, the process may be performed for about 0.2 hours to 2 hours. Additionally, the granulation step may be performed under the condition of about 30° C. to 70° C. However, the stirring conditions including the speed, time and temperature are not particularly limited to the above-described range and may be properly controlled to obtain complex particles having a suitable particle diameter from the mixture.

In an embodiment of the present disclosure, a granulator, for example, Granurex® (Freund), New-Gra Machine (Seishin) and Agglomaster (Hosokawa Micron), and shearing machine having shear and compression processing capability, for example, Hybridization System (NARA Machinery), Mechano Micros (NARA Machinery), Mechano Fusion system (for example, Hosokawa Micron) may be used in the granulation process.

Besides, the particle size of the graphite material may be properly controlled using a pulverizer selected from Counter Jet Mill (Hosokawa Micron, JP), ACM Pulverizer (Hosokawa Micron, JP) and Current Jet (Nisshin, JP); a granulator selected from SARARA® (Kawasaki Heavy Industries, Ltd, JP), GRANUREX® (Freund Corporation, JP), New-Gra Machine (Seishin, JP) and Acromaster (Hosakawa Micron, JP); and a mixer selected from a dispersion kneader and two-roll.

The flaky and/or platy graphite material particles inputted as a raw material has been bent or folded when subjected to spherical shaping, or when other material particles are bent or folded, introduced into them or attached to their surface. As a result, complex particles may show granular shape by overlapping flaky and/or platy graphite particles such as spherical graphite particles, and the gaps between the overlapping flaky and/or platy particles are filled with the mixture including the conductive material and the solid electrolyte (see FIG. 2).

Figure 1:
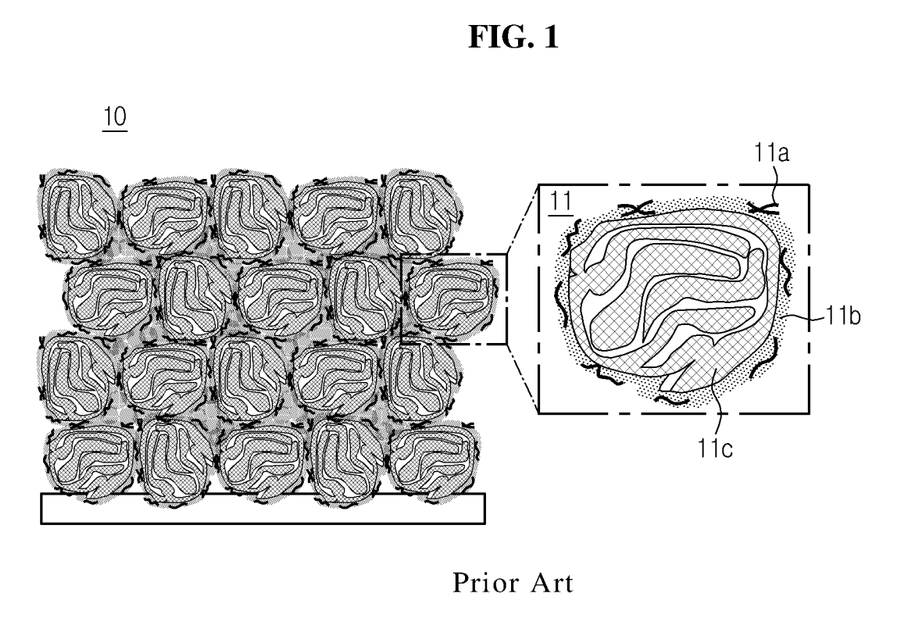
FIG. 1 is a schematic cross-sectional view of spherical graphite particles used for a negative electrode active material according to the related art and an electrode comprising the spherical graphite particles.

As the complex particles according to the present disclosure are filled with the solid electrolyte and the conductive material as described above, the electrochemical performance such as ionic conductivity is remarkably improved compared to the conventional negative electrode active material particles. FIG. 1 shows the conventional negative electrode active material particles 11 and an electrode 10 including the same, in which gaps between negative electrode active material particles 11c remain empty and a conductive material 11a and a solid electrolyte 11b are only distributed on the surface of the active material particles and a small amount of them participates in electrochemical reactions into the active material particles, and accordingly, compared to the input amount of active materials, the electrochemical performance such as ionic conductivity or output characteristics is not sufficiently exerted.

Hereinafter, a negative electrode of a lithium ion secondary battery using the complex particles of the present disclosure, and an all-solid type battery including the negative electrode will be described.

Negative Electrode

The present disclosure relates to a negative electrode for an electrochemical device, and the electrochemical device is preferably an all-solid type battery using a solid electrolyte.

In an embodiment of the present disclosure, the negative electrode may include a current collector and a negative electrode active material layer formed on at least one surface of the current collector, the negative electrode active material layer includes a negative electrode active material, a solid electrolyte and a conductive material, and the negative electrode active material includes the complex particles according to the present disclosure.

The conventional spherical graphite particles are difficult to be used for, in particular, a negative electrode for an all-solid type battery. For example, spherical graphite particles obtained by granulating a flaky graphite material by an external mechanical force have gaps or empty spaces between graphite flakes. In case that the spherical graphite particles are applied to a battery using a liquid electrolyte, the electrolyte solution penetrates into the particles and fills the gaps, and there is no problem with reduced contact area between the electrode active material and the electrolyte solution. However, in case that spherical graphite particles are applied to an all-solid type battery using a solid electrolyte, the gaps within the spherical graphite particles are not filled with the electrolyte, leaving the spaces empty, the contact between the electrolyte and the particles is restricted to the surface of the particles, and accordingly, electrochemical reaction sites reduce and capacity reduces. To remove the gaps and form the active material layer with high density in order to increase the discharge capacity per volume, pressing under high pressure is required, but in this case, the particles become flat and face in one direction, resulting in reduced ion diffusion.

In contrast, the complex particles according to the present disclosure have very low porosity in the particles because the particles are filled with the mixture of the solid electrolyte and the conductive material.

Additionally, in a particular embodiment of the present disclosure, the negative electrode active material layer may further include a binder material. The introduction of the binder material may increase the bonding between the negative electrode active material layer and the current collector and/or the solid electrolyte film, and aside from or along with this, it helps improve the bonding between the components included in the negative electrode active material.

The method for manufacturing the negative electrode is not limited to a particular one, and for example, the negative electrode may be manufactured by the following process. First, an electrode material including complex particles, a solid electrolyte and a conductive material is prepared, and the electrode material is coated on the surface of a current collector to form an electrode active material layer. In this instance, the porosity in the electrode may be controlled to a desired level by applying proper pressure to the coated electrode active material layer.

Additionally, in a particular embodiment of the present disclosure, the electrode preferably has a low porosity of 0 to 10 vol %. The porosity may be measured using adsorbent gas such as nitrogen with BEL JAPAN BELSORP (BET equipment) or by the mercury intrusion porosimetry. Alternatively, in an embodiment of the present disclosure, the net density of the electrode active material layer may be calculated from the density (apparent density) of the obtained electrode (electrode active material layer), the composition of the materials included in the electrode (electrode active material layer) and the density of each component, and the porosity of the electrode active material layer may be calculated from a difference between the apparent density and the net density.

Meanwhile, the solid electrolyte and the conductive material used to manufacture the negative electrode are not limited to a particular type and includes those used to prepare the complex particles.

All-Solid Type Battery

The present disclosure relates to an all-solid type battery, and the all-solid type battery includes a positive electrode, a negative electrode and a solid electrolyte film interposed between the positive electrode and the negative electrode, and the negative electrode is defined according to the present disclosure and has the above-described feature.

The positive electrode includes a current collector and a positive electrode active material layer formed on at least one surface of the current collector, and the positive electrode active material layer includes a positive electrode active material, a solid electrolyte and a conductive material. Additionally, in a particular embodiment of the present disclosure, the positive electrode active material layer may further include a binder material. The introduction of the binder material may increase the bonding between the positive electrode active material layer, the current collector and/or the solid electrolyte film, and aside from or along with this, it helps improve the bonding between the components included in the positive electrode active material.

The positive electrode active material is not limited to a particular type and includes those that can be used as a positive electrode active material of a lithium ion secondary battery. For example, the positive electrode active material may include layered compounds such as lithium cobalt oxide ($LiCoO_2$) and lithium nickel oxide ($LiNiO_2$), or compounds with one or more transition metal substitution; lithium manganese oxide such as formula $Li_{1+x}Mn_{2-x}O_4$ (x=0~0.33), $LiMnO_3$, $LiMn_2O_3$, $LiMnO_2$; lithium copper oxide ($Li_2CuO_2$); vanadium oxide such as $LiV_3O_8$, $LiFe_3O_4$, $V_2O_5$, $Cu_2V_2O_7$; Ni site lithium nickel oxide represented by chemical formula $LiNi_{1-x}M_xO_2$ (M=Co, Mn, Al, Cu, Fe, Mg, B or Ga, x=0.01~0.3); lithium manganese composite oxide represented by chemical formula $LiMn_{2-x}M_xO_2$ (M=Co, Ni, Fe, Cr, Zn or Ta, x=0.01~0.1) or $Li_2Mn_3MO_8$(M=Fe, Co, Ni, Cu or Zn); lithium manganese composite oxide of spinel structure represented by $LiNi_xMn_{2-x}O_4$; $LiMn_2O_4$ with partial substitution of alkali earth metal ion for Li in chemical formula; disulfide compounds; and $Fe_2(MoO_4)_3$. However, the positive electrode active material is not limited thereto.

The conductive material and the solid electrolyte are not limited to a particular type and include those that can be used for complex particles.

In the present disclosure, the solid electrolyte film includes a polymer material with ion conducting properties and/or an inorganic material, and for example, may be applied as an ion conductive electrolyte to an all-solid type battery that does not use a liquid electrolyte. The ion conductive polymer material and the inorganic material included in the solid electrolyte film are not limited to a particular type and include those that can be used to prepare the complex particles of the present disclosure, and for more details, a reference may be made to the above description of the solid electrolyte in the complex particles.

In an embodiment of the present disclosure, the negative electrode and/or the positive electrode may further include various types of additives for the purpose of supplementing or improving the physical and chemical properties. The additive is not limited to a particular type and may include at least one of an oxidation stabilizing agent, a reduction stabilizing agent, a flame retardant, a heat stabilizer and an antifogging agent.

Meanwhile, the binder material used in the negative electrode and/or the positive electrode is not limited to a particular type and includes those that aid the bonding between the active material and the conductive material and bonding between the active material and the current collector, and may include, for example, polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene rubber, fluorine rubber and a variety of copolymers. In general, the binder resin may be present in an amount of 1 to 30 weight % or 1 to 10 weight % based on 100 weight % of the electrode layer.

Additionally, in an embodiment of the present disclosure, the negative electrode current collector and/or the positive electrode current collector is not limited to a particular type and includes those having high conductivity while not causing a chemical reaction to the corresponding battery, and may include, for example, stainless steel, aluminum, nickel, titanium, sintered carbon, or aluminum or stainless steel treated with carbon, nickel, titanium and silver on the surface. These may be appropriately selected and used according to the polarity of the positive electrode and the negative electrode. In an embodiment of the present disclosure, the current collector may be about 6 μm to 500 μm thick.

Additionally, the present disclosure provides a battery module including the secondary battery as a unit battery, a battery pack including the battery module and a device including the battery pack as a power source.

In this instance, specific examples of the device include power tools that operate with power from an electric motor; electric vehicles including Electric Vehicles (EVs), Hybrid Electric Vehicles (HEVs) and Plug-in Hybrid Electric Vehicles (PHEVs); electric two wheelers including E-bikes and E-scooters; electric golf carts; and ESSs, but are not limited thereto.

Hereinafter, the present disclosure is described in detail through examples, but the following examples are provided for illustration only and the scope of the present disclosure is not limited thereto.

1) PREPARATION EXAMPLE 1: PREPARATION OF COMPLEX PARTICLES

Example 1

Platy natural graphite (BTR UP10, average particle diameter($D_{50}$)=9 μm), $Li_7La_3Zr_2O_{12}$ and carbon black of a weight ratio of 84:15:1 are inputted into a planetary mixer (pri-mix, 2P-03) of 500 ml capacity, and stirred at 50 rpm at room temperature for 60 minutes to prepare a mixture. The temperature of the planetary mixer is maintained at 40° C. The obtained mixture is inputted into Mechano Fusion system (Hosokawa Micron NOB-130-VC) and shear and compressive stress is applied at 3,000 rpm for 30 minutes to prepare complex particles. In this instance, the temperature of the Mechano Fusion system is maintained at 40° C. The particle diameter of the obtained complex particles is about 15 μm. The particle diameter and the particle size distribution are measured using Malvern mastersizer 3000 after the complex particles are diluted in xylene 1,000 times.

Examples 2 to 4

Figure 3:
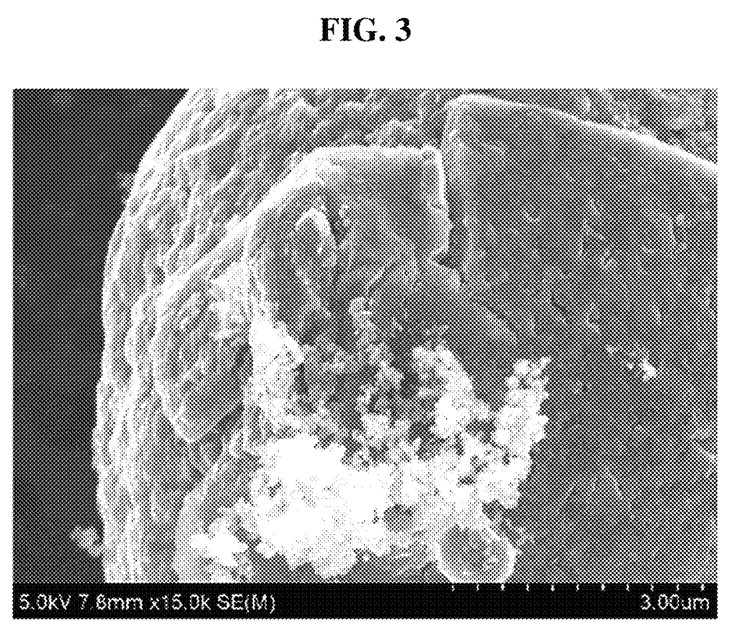
FIG. 3 is a scanning electron microscope (SEM) image of complex particles according to example 1.

Platy natural graphite (BTR UP10, average particle diameter($D_{50}$)=9 μm), $Li_2S$—$P_2S_5$ and carbon black of the ratio of [Table 1] are inputted into a planetary mixer (pri-mix, 2P-03) of 500 ml capacity, and stirred at 50 rpm at room temperature for 60 minutes to prepare a mixture. The temperature of the planetary mixer is maintained at 40° C. The obtained mixture is inputted into Mechano Fusion system (Hosokawa Micron NOB-130-VC) and shear and compressive stress is applied at 3,000 rpm for 30 minutes to prepare complex particles. In this instance, the temperature of the Mechano Fusion system is maintained at 40° C. The particle diameter of the obtained complex particles is about 15 μm. The particle diameter and the particle size distribution are measured using Malvern mastersizer 3000 after the complex particles are diluted in xylene 1,000 times. FIG. 3 is an SEM image of the complex particles of example 2. According to FIG. 3, it can be seen that as the platy particles are granulated in spherical shape, the gaps between the platy particles are filled with the mixture of the solid electrolyte and the conductive material and the surface of the complex particles is coated with the mixture. The mix ratio (weight %) of each material is as shown in the following Table 1.

Example 5

Platy natural graphite (BTR UP10, average particle diameter($D_{50}$)=9 μm), $Li_2S$—$P_2S_5$ and carbon black of a weight ratio of 84:15:1 are inputted into a planetary mixer (pri-mix, 2P-03) of 500 ml capacity, and stirred at 50 rpm at room temperature for 60 minutes to prepare a mixture. The temperature of the planetary mixer is maintained at 40° C. The obtained mixture is inputted into Mechano Fusion system (Hosokawa Micron NOB-130-VC) and shear and compressive stress is applied at 4,000 rpm for 15 minutes to prepare complex particles. In this instance, the temperature of the Mechano Fusion system is maintained at 40° C. The particle diameter of the obtained complex particles is about 11 μm. The particle diameter and the particle size distribution are measured using Malvern mastersizer 3000 after the complex particles are diluted in xylene 1,000 times.

Example 6

Complex particles are prepared by the same method as example 5 except that shear and compressive stress is applied using Mechano Fusion system at 2,000 rpm for 60 minutes to obtain the complex particles of the particle diameter of about 19 μm.

Example 7

Platy natural graphite (BTR UPS, average particle diameter($D_{50}$)=5 μm), $Li_2S$—$P_2S_5$ and carbon black of a weight ratio of 84:15:1 are inputted into a planetary mixer (pri-mix, 2P-03) of 500 ml capacity, and stirred at 50 rpm at room temperature for 60 minutes to prepare a mixture. The temperature of the planetary mixer is maintained at 40° C. The obtained mixture is inputted into Mechano Fusion system (Hosokawa Micron NOB-130-VC) and shear and compressive stress is applied at 3,000 rpm for 30 minutes to prepare complex particles. In this instance, the temperature of the Mechano Fusion system is maintained at 40° C. The particle diameter of the obtained complex particles is about 13.8 μm. The particle diameter and the particle size distribution are measured using Malvern mastersizer 3000 after the complex particles are diluted in xylene 1,000 times.

Comparative Example 1

Active material particles are prepared by the same method as example 1 except a conductive material and a solid electrolyte are not inputted and only platy graphite is used.

2) PREPARATION EXAMPLE 2: MANUFACTURE OF NEGATIVE ELECTRODE

A negative electrode is manufactured using the complex particles obtained in each of examples and comparative examples for a negative electrode active material. The negative electrode composition is prepared as shown in the following [Table 2]. Comparative examples 1-1 and 1-2 are prepared using the complex particles of comparative example 1 with varying solid electrolyte materials as shown in [Table 2]. The negative electrode active materials obtained in each of examples and comparative examples exhibit the capacitance of about 355 mAh/g. An active material, a solid electrolyte, a conductive material and a binder are mixed as shown in [Table 2] to prepare an electrode material, and the electrode material is coated on a copper foil (thickness 20 μm) and pressed at room temperature to manufacture a negative electrode. The loading amount of the negative electrode active material in the obtained negative electrode is 9.2 mg/cm² based on the electrode area, the capacitance is 3.27 mAh/cm² based on the electrode area and the porosity is 22%. Regarding the porosity, after the net density of the electrode active material layer is calculated from the composition ratios of the electrode materials and the density of each component, the porosity of the electrode active material layer is calculated from a difference between the apparent density and the net density.

3) MANUFACTURE OF ALL-SOLID TYPE BATTERY

Lithium metal is used for a counter electrode, and a battery (coin type half-cell) is manufactured using each electrode manufactured in preparation example 2. A solid electrolyte film (70 μm, 2.8×10⁻³ S/cm, $Li_{10}SnP_2Si_{12}$) is interposed between the used electrodes.

TABLE 1

|  | Comparative example 1 | Example 1 | Example 2 | Example 3 | Example 4 | Example 5 | Example 6 | Example 7 |
|---|---|---|---|---|---|---|---|---|
| Graphite material (platy natural graphite) (weight %) | 100 | 85 | 94 | 89 | 84 | 84 | 84 | 84 |
| Solid electrolyte ($Li_2S$—$P_2S_5$) (weight %) | — | 15 | 5 | 10 | 15 | 15 | 15 | 15 |
| Conductive material (Carbon black) (weight %) | — | 1 | 10 | 11 | 1 | 1 | 1 | 1 |

TABLE 2

| | Comparative example 1-1 | Comparative example 1-2 | Example 1 | Example 2 | Example 3 | Example 4 | Example 5 | Example 6 | Example 7 |
|---|---|---|---|---|---|---|---|---|---|
| Active material (complex particles) (weight %) | 75 | 75 | 89.28 | 79.79 | 84.27 | 89.28 | 89.28 | 89.28 | 89.28 |
| Solid electrolyte ($Li_2S$—$P_2S_5$) (weight %) | 20 | 20 | 6.61 | 16.01 | 11.57 | 6.61 | 6.61 | 6.61 | 6.61 |
| Conductive material (Carbon black) (weight %) | 3 | 3 | 2.11 | 2.2 | 2.16 | 2.11 | 2.11 | 2.11 | 2.11 |
| Binder (NBR) (weight %) | 2 | 2 | 2 | 2 | 2 | 2 | 2 | 2 | 2 |

4) BATTERY PERFORMANCE EVALUATION

For the batteries prepared in each of examples and comparative examples, testing is carried out to determine the initial capacity and cycling characteristics. During the first 3 cycles, the batteries are charged to 0.05V in 0.05 C CC mode, then charged to 0.05 C current density in CV mode, and they are discharged to 1.5V in 0.05 C CC mode. Subsequently, from the 4th cycle, the batteries are charged to 0.05V in 0.3 C CC mode and then charged to 0.05 C current density in CV mode, and they are discharged to 1.5V in 0.3 C CC mode for 30 cycles, and after then, capacity retention is compared. In the experiment, capacity retention is calculated based on the following <Equation 1>.

Capacity retention(%)=[30th cycle discharge capacity/2nd cycle discharge capacity]×100    <Equation 1>

The following Table 3 shows the initial capacity and 30 cycle capacity retention results of the batteries prepared in each of examples and comparative examples. According to Table 3, it is found that the example battery has better performance in terms of initial capacity and capacity retention than the comparative example battery.

particles is large, the electrolyte component included in the particles is insufficient and performance is slightly lower than that of example 4.

Additionally, example 7 using fine particulate platy graphite yields complex particles, but ionic conductivity of the solid electrolyte reduces due to the increased surface area of the graphite particles, resulting in a slight reduction in battery performance.

What is claimed is:

1. Complex particles for a negative electrode active material, comprising:
    graphite particles of a granulated graphite material, and
    a mixture including a solid electrolyte and a conductive material,
    wherein the granulated graphite material is derived from any one of natural graphite or artificial graphite,
    gaps within the granulated graphite material inside of the graphite particles are filled with the mixture, and an outer surface of the graphite particles is coated with the mixture in whole or at least in part, and
    the granulated graphite material is included in an amount ranging from 70 weight % to 95 weight % based on 100 weight % of the complex particles.

TABLE 3

| | Comparative example 1-1 | Comparative example 1-2 | Example 1 | Example 2 | Example 3 | Example 4 | Example 5 | Example 6 | Example 7 |
|---|---|---|---|---|---|---|---|---|---|
| Initial capacity (0.05 C-rate)(mAh/g) | 278 | 262 | 294 | 315 | 336 | 342 | 331 | 326 | 307 |
| 0.3 C capacity retention 30 cycle | 40 | 32 | 61 | 74 | 82 | 79 | 68 | 72 | 64 |

As noted above, it can be seen that with the increasing ratio of the electrolyte in the complex particles, ion movement into the complex particles is improved, and thus low rate capacity characteristics are good and capacity retention is high.

Meanwhile, the complex particles prepared using an oxide-based solid electrolyte as in example 1 has a performance improvement effect compared to graphite particles without a solid electrolytes(comparative example 1), but they have lower ductility of the material than the complex particles using a sulfide-based solid electrolyte according to example 4 and the performance improvement effect is not high.

Meanwhile, referring to examples 4, 5 and 6, it can be seen that when the particle diameter of the complex particles is small, the electrolyte component between complexes is insufficient, and when the particle diameter of the complex 2. The complex particles for a negative electrode active material according to claim 1, wherein the complex particles have a particle diameter of 5 μm to 50 μm.

3. The complex particles for a negative electrode active material according to claim 1, wherein the natural graphite is at least one highly crystalline natural graphite selected from platy, flaky, wavy, elliptical or whisker-shaped natural graphite.

4. The complex particles for a negative electrode active material according to claim 1, wherein the solid electrolyte is included in an amount of 3 weight % to 50 weight % based on 100 weight % of the complex particles.

5. The complex particles for a negative electrode active material according to claim 1, wherein the solid electrolyte includes a sulfide-based solid electrolyte.

6. The complex particles for a negative electrode active material according to claim 1, wherein the conductive material includes one selected from graphite, carbon black, a conductive fiber, metal powder, potassium titanate, conductive whisker, conductive metal oxide, a polyphenylene derivative, or a mixture thereof.

7. A method for preparing the complex particles for a negative electrode active material according to claim 1, comprising:
   mixing a graphite material, a conductive material and a solid electrolyte to form a mixed composition, and
   performing a spherical granulation process on the mixed composition by applying an external mechanical force to obtain the complex particles into which the graphite material, the conductive material and the solid electrolyte are integrally formed.

8. The method for preparing the complex particles according to claim 7, wherein the granulation process is performed using one selected from a pulverizer; a granulator; a mixer selected from a dispersion kneader or two-roll; or a compression and shear processing machine selected from Mechano Micros, an extruder, a ball mill, a planetary mill, Mechano Fusion system, Nobilta, Hybridization System or a rotary ball mill or their combination.

9. The method for preparing complex particles according to claim 7, wherein the mixed composition comprises 49 weight % to 95 weight % of the graphite material, 3 weight % to 50 weight % of the solid electrolyte, and 1 weight % to 10 weight % of the conductive material, based on 100 weight % of the mixed composition.

10. An all-solid type battery, comprising
    a negative electrode, a positive electrode and a solid electrolyte film interposed between the negative electrode and the positive electrode,
    wherein the negative electrode comprises the complex particles for a negative electrode active material according to claim 1.

11. The complex particles for a negative electrode active material according to claim 1, wherein the conductive material is included in an amount of 1 weight % to 10 weight % based on 100 weight % of the complex particles.

12. The complex particles for a negative electrode active material according to claim 1, wherein the artificial graphite includes at least one of mosaic cokes-based artificial graphite or needle cokes-based artificial graphite.

13. The complex particles for a negative electrode active material according to claim 1, wherein the solid electrolyte includes an ion conductive solid electrolyte material, a polymer solid electrolyte, an inorganic solid electrolyte, or a mixture thereof.

* * * * *